US007471944B2

(12) United States Patent
Gabler et al.

(10) Patent No.: US 7,471,944 B2
(45) Date of Patent: Dec. 30, 2008

(54) METHOD AND APPARATUS FOR IDENTIFYING AND TRACKING TARGET SUBSCRIBERS IN A UNIVERSAL MOBILE TELEPHONE SYSTEM

(75) Inventors: Karl-Heinz Gabler, Erlangen (DE); Siegfried Steiger, Happurg (DE)

(73) Assignee: Alcatel - Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/175,907

(22) Filed: Jul. 6, 2005

(65) Prior Publication Data

US 2007/0010240 A1  Jan. 11, 2007

(51) Int. Cl.
*H04M 3/16* (2006.01)
*H04M 1/00* (2006.01)
*H04Q 7/20* (2006.01)
*H04Q 7/00* (2006.01)
*H04B 1/38* (2006.01)

(52) U.S. Cl. ............... 455/410; 455/411; 455/435.2; 455/439; 455/550.1; 455/552.1; 455/561; 370/331

(58) Field of Classification Search ... 455/456.1–456.6, 455/62, 95, 68–69, 403, 453, 168.1, 176.1, 455/404.2, 410–411, 422.1, 424–425, 432.1, 455/432.2, 432.3, 436–451, 435.1–435.3, 455/452.1, 452.2, 457–458, 500, 551, 508–509, 455/550.1, 516–517, 552.1, 553.1, 556.2, 455/560–561, 423; 370/310, 315, 329, 331, 370/338, 341
See application file for complete search history.

(56) References Cited

U.S. PATENT DOCUMENTS

| 2,218,716 | A  | * | 10/1940 | Matthews | ............... 409/155 |
|---|---|---|---|---|---|
| 5,218,716 | A  |   | 6/1993  | Comroe et al. | ......... 455/33.4 |
| 5,491,716 | A  | * | 2/1996  | Bond | ................... 375/130 |
| 5,895,436 | A  |   | 4/1999  | Savoie et al. | ............ 701/214 |
| 5,929,752 | A  |   | 7/1999  | Janky et al. | ............. 340/426 |
| 6,047,066 | A  | * | 4/2000  | Brown et al. | ................ 380/2 |
| 6,950,675 | B2 | * | 9/2005  | Wilhelm | .............. 455/552.1 |
| 6,959,201 | B2 | * | 10/2005 | Leprieur et al. | ...... 455/552.1 |
| 7,046,992 | B2 | * | 5/2006  | Wallentin et al. | ....... 455/411 |
| 2002/0066011 | A1 | * | 5/2002  | Vialen et al. | ............. 713/150 |
| 2002/0168989 | A1 | * | 11/2002 | Dooley et al. | ........... 455/456 |
| 2004/0022216 | A1 | * | 2/2004  | Shi | ........................ 370/335 |
| 2004/0029558 | A1 |   | 2/2004  | Liu | ..................... 455/404.2 |
| 2005/0100165 | A1 | * | 5/2005  | Rose et al. | ............... 380/270 |
| 2005/0149734 | A1 | * | 7/2005  | Eronen et al. | ........... 713/176 |
| 2005/0176431 | A1 | * | 8/2005  | Herrero Veron | ......... 455/436 |

FOREIGN PATENT DOCUMENTS

WO  WO 02/01902 A1 *  1/2002

OTHER PUBLICATIONS

International PCT Search Report PCT/US2006/025729 dated Jul. 22, 2006.

* cited by examiner

*Primary Examiner*—Meless N Zewdu

(57) ABSTRACT

A method is provided for tracking a mobile device in a wireless communications system. The method comprises establishing communications between the mobile device and a masquerading base station with the mobile device operating in a first mode, such as UMTS. The mobile device is urged to operate in a second mode such as GMS, and the mobile device is then tracked in the second mode of operation.

12 Claims, 3 Drawing Sheets

METHOD AND APPARATUS FOR IDENTIFYING AND TRACKING TARGET SUBSCRIBERS IN A UNIVERSAL MOBILE TELEPHONE SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations, each serving a cell, distributed within an area to be serviced by the system. Various mobile devices within the area may then access the system and, thus, other interconnected telecommunications systems, via one or more of the base stations. Typically, a mobile device maintains communications with the system as it passes through an area by communicating with one and then another base station, as the mobile device moves while maintaining an active user connection to the network. The process of moving from one base station to another is commonly referred to as a handoff and it may occur relatively often if the active mobile device is moving rapidly. The mobile device may communicate with the closest base station, the base station with the strongest signal, the base station with a capacity sufficient to accept communications, etc. A mobile device currently not involved in an active user connection selects the most suitable cell to camp on by applying standardized criteria based on measurements and ranking algorithms of surrounding cells as indicated by the serving cell. The process of selecting a cell to camp on for idle mobile devices is commonly referred to as cell re-selection.

Circumstances occasionally arise in which legal authorities may need to identify and track a target subscriber using such a mobile device. In the Global System for Mobile Communication (GSM), legal authorities use special equipment to identify and track target subscribers who use GSM mobile devices for their communications. In GSM, this equipment works by masquerading as a cell of the GSM network where the target subscriber is currently located. This triggers the mobile device to re-select to the masquerading cell and eventually tell the masquerading cell its permanent identification (e.g., by means of standardized layer 3 signaling messages). This procedure effectively exploits a security gap in the GSM standards.

GSM is in the process of being replaced by a Universal Mobile Telephone System (UMTS). The GSM procedure for identifying and tracking target subscribers is not, however, directly applicable to UMTS since the security gap has been closed in UMTS standards. Thus, target subscribers operating within the UMTS system cannot be identified or tracked using the identical procedures as in GSM.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for tracking a mobile device in a wireless communications system. The method comprises establishing communications between the mobile device and a masquerading base station with the mobile device operating in a first mode. The mobile device is urged to operate in a second mode, and the mobile device is then tracked in the second mode of operation.

BRIEF DESCRIPTION OF THE DRAWINGS

The invention may be understood by reference to the following description taken in conjunction with the accompanying drawings, in which like reference numerals identify like elements, and in which.

Figure 1:
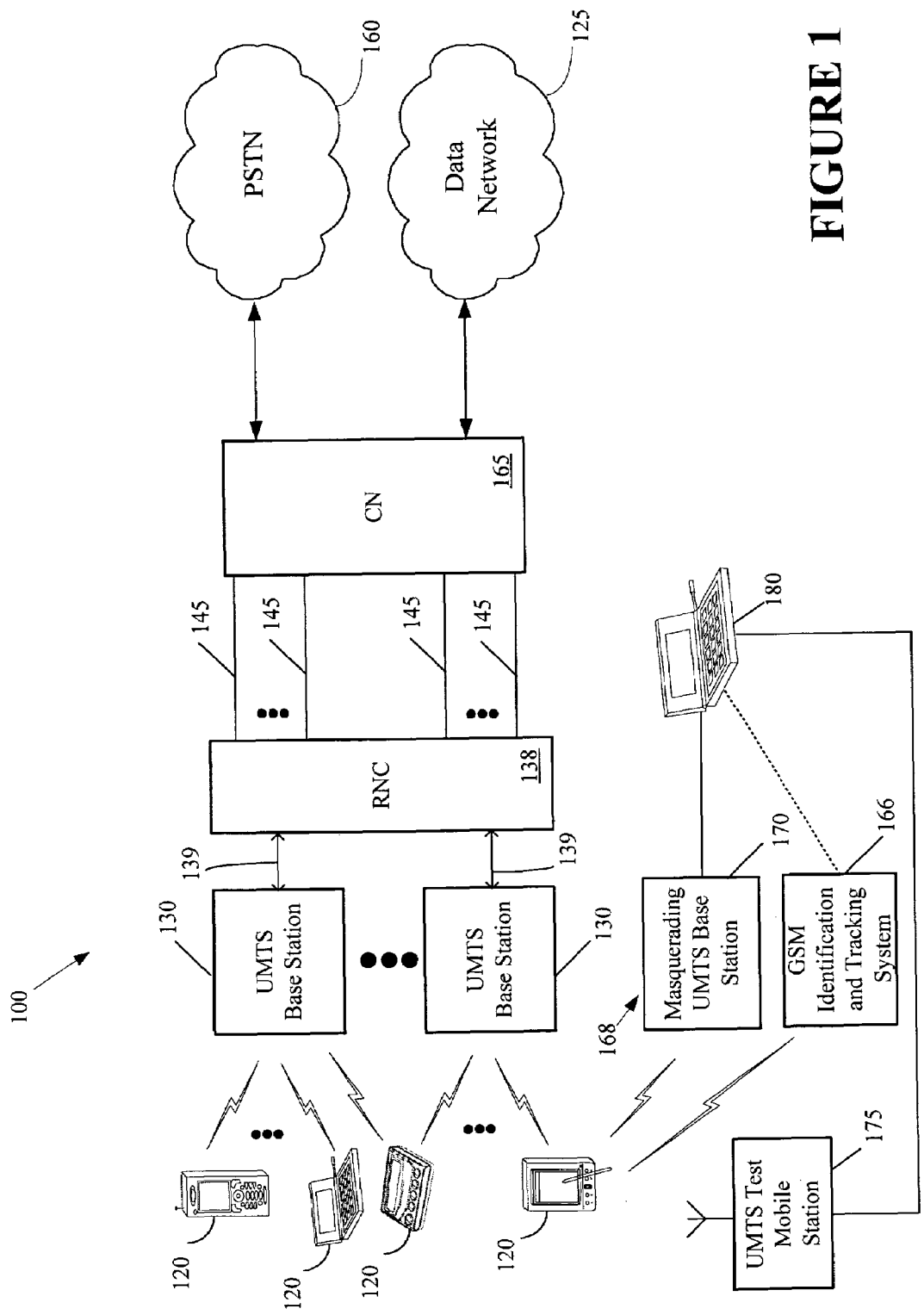
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a wireless communications system 100 is illustrated, in accordance with one embodiment of the present invention. In one embodiment of the instant invention, the communications system 100 of FIG. 1 is a Universal Mobile Telephone System (UMTS). The communications system 100 allows one or more mobile devices 120 to communicate with a data network 125, such as the Internet, and/or a Publicly Switched Telephone Network (PSTN) 160 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

In one embodiment, a plurality of the base stations 130 may be coupled to a Radio Network Controller (RNC) 138 by one or more connections 139, such as T1/EI lines or circuits, ATM circuits, cables, digital subscriber lines (DSLs), and the like. Although one RNC 138 is illustrated, those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each user 120 and for each sector supported by each of the base stations 130.

The RNC 138 is also coupled to a Core Network (CN) 165 via a connection 145, which may take on any of a variety of forms, such as T1/EI lines or circuits, ATM circuits, cables, optical transmission lines, and the like. Generally the CN 165 operates as an interface to a data network 125 and/or to the PSTN 160. The CN 165 performs a variety of functions and operations, such as user authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

The data network 125 may be a packet-switched data network, such as a data network according to the Internet Protocol (IP). The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the mobile devices 120 and the data network 125 and/or the PSTN 160. It should be understood, however, that the configuration of the communications system 100 of FIG. 1 is exemplary in nature, and that fewer or additional components may be employed in other embodiments of the communications system 100 without departing from the spirit and scope of the instant invention.

The UMTS standards identify a mechanism called integrity protection. This mechanism allows the mobile device 120 to verify whether a received signaling message comes from a trustworthy source, e.g., the operator or roaming network to which the user subscribes. Integrity protection is switched on during very early stages of the signaling communication between the mobile device 120 and the system 100. Due to this early activation, the use of unprotected signaling messages is limited in UMTS. The existence of integrity protection prevents the procedures used for identifying and tracking subscribers in GSM from being implemented identically in UMTS.

Generally, many of the mobile devices 120 are dual mode type devices, capable of operating with either UMTS or GSM based systems. Thus, when such a dual mode mobile device 120 is in a region that supports only GSM, it controllably switches to a second mode of operation that allows it to communicate with the GSM system. In one embodiment of the instant invention, these dual mode devices 120 may be "forced" to operate in the GSM mode where they can be handled by the existing GSM identification and tracking system.

As shown in FIG. 1, a conventional GSM Identification and Tracking System 166 and a UMTS tracking and identification system 168 are shown. The UMTS tracking and identification system 168 is comprised of a masquerading base station 170 operating in conjunction with a UMTS test mobile station 175 and a computer 180, such as a laptop computer. The UMTS tracking and identification system 168 controls the process of forcing the dual mode mobile device 120 to operate in the GSM mode. The UMTS tracking and identification system 168 may be portable and/or located in a vehicle to facilitate transport to a region associated with a target cell. Consequently, in some embodiments of the instant invention, it may be useful for the masquerading base station 170 to be a lightweight, small-sized UMTS base station. Further, those skilled in the art will appreciate that the UMTS test mobile station 175 may also take the form of commercial mobile equipment with specialized software. The operation of the masquerading base station 170, the UMTS test mobile station 175 and the computer 180 is discussed in greater detail below in conjunction with the flow chart of FIG. 3.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
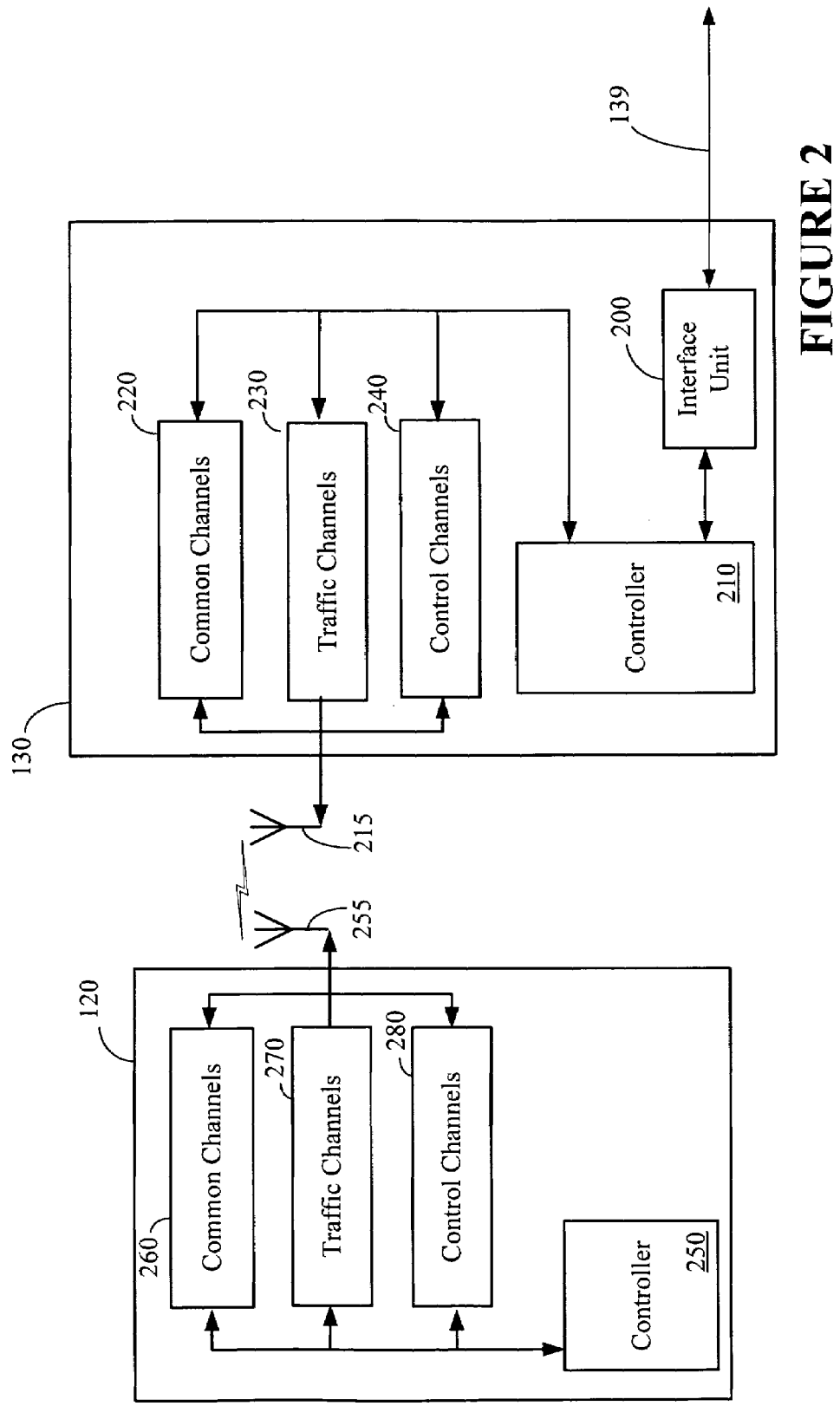
FIG. 2 depicts a block diagram of one embodiment of a base station and a mobile device in the communications system of FIG. 1.

Referring now to FIG. 2, a block diagram of one embodiment of a functional structure associated with an exemplary base station 130 and mobile device 120 is shown. The base station 130 includes an interface unit 200, a controller 210, an antenna 215 and a plurality of channels, such as common channels 220, traffic channels 230, control channels 240, and the like. The interface unit 200, in the illustrated embodiment, controls the flow of information between the base station 130 and the RNC 138 (see FIG. 1). The controller 210 generally operates to control both the transmission and reception of data and control signals over the antenna 215 and the plurality of channels 220, 230, 240 and to communicate at least portions of the received information to the RNC 138 via the interface unit 200.

The mobile device 120 shares certain functional attributes with the base station 130. For example, the mobile device 120 includes a controller 250, an antenna 255 and a plurality of channels, such as common channels 260, traffic channels 270, control channels 280, and the like. The controller 250 generally operates to control both the transmission and reception of data and control signals over the antenna 255 and the plurality of channels 260, 270, 280. Normally, the channels 260, 270, 280 in the mobile device 120 communicate with the corresponding channels 220, 230, 240 in the base station 130. Under the operation of the controllers 210, 250, the channels 220, 260; 230, 270; 240, 280 are used to effect a controlled transfer of communications between the mobile device 120 to the base station 130.

Those skilled in the art will appreciate that the structure and function of the masquerading base station 170 is substantially similar to the aspects of the base station 130 discussed above.

In one embodiment of the instant invention, a five step procedure is implemented to ensure that a re-selection sequence executed by the dual mode mobile device 120 ends in the mobile device 120 operating in the GSM mode. In the GSM mode, existing GSM equipment for identification and tracking can be used with the complete available functionality.

Figure 3:
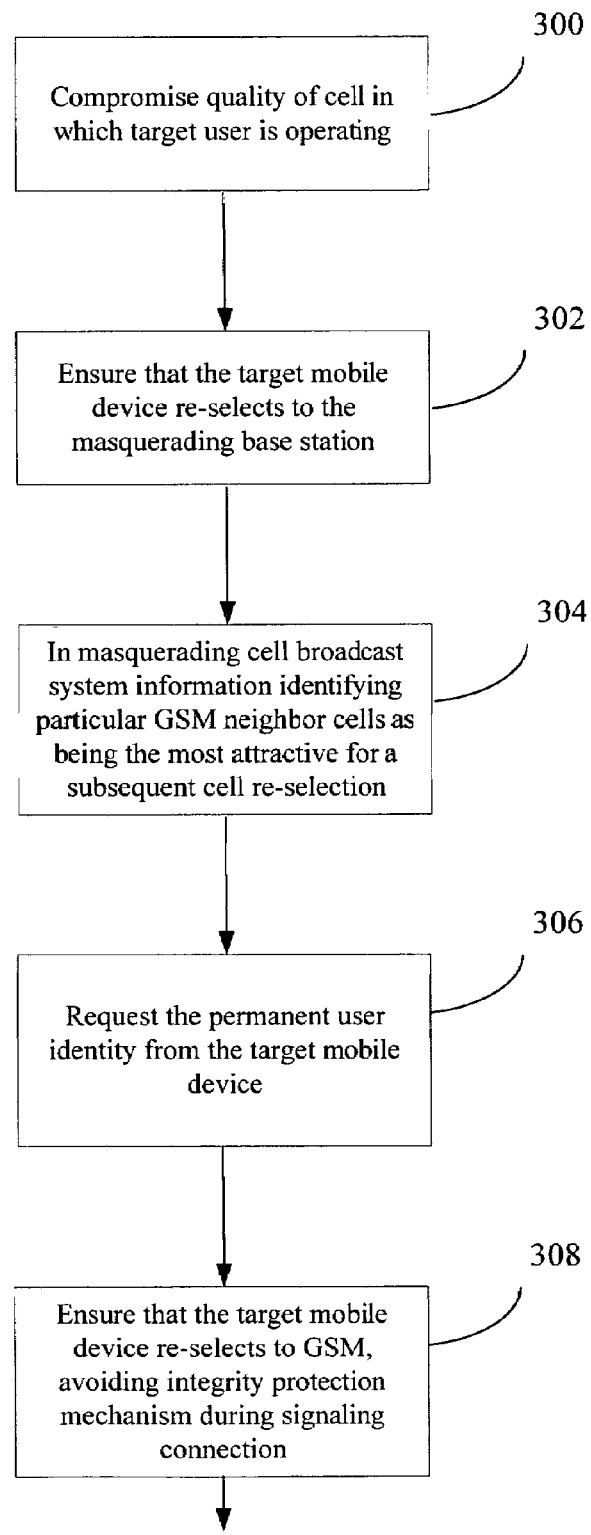
FIG. 3 depicts a flow chart of one embodiment of a method that may be used to force the mobile device of FIGS. 1 and 2 to operate in a GSM mode.

Generally, as described in the flowchart of FIG. 3, the procedure begins at block 300 by compromising the quality of the cell in which the target user is currently operating. The quality of the cell may be compromised using any of a variety of conventional techniques, such as transmitting interfering signals from the masquerading base station 170. The masquerading base station 170 mimics one of the cells of the wireless communication system 100 on which the target user originally camped. In order to be able to do so, the UMTS test mobile station 175 scans the wireless communication system 100 in a nearby area to discover the system parameters, which in the end allow the transmissions from masquerading base station 170 to be configured appropriately. The laptop computer 180 may be used to configure and control the masquerading base station 170 to produce the interfering signals using the system parameters extracted from the wireless communication system 100 by the UMTS test mobile station 175. The compromised quality of the cell causes the mobile device 120 to begin a conventional re-selection process to locate a more suitable cell in which to communicate.

At block 302, the UMTS test mobile station 175 and/or the laptop computer 180 control the masquerading base station 170 to ensure that the target mobile device 120 re-selects to the cell masqueraded by the UMTS identification and tracking system 168. The reselection process performed by the mobile device 120 may be influenced by any of a variety of conventional methods, such as by controlling the masquerading base station 170 to transmit at a relatively high-power level, as compared to other UMTS base stations 130 in a nearby area around the target mobile device 120. As shown in block 304, the UMTS identification and tracking system 168 broadcasts manipulated system information such that the target mobile device 120 identifies particular GSM neighbor cells as being the most attractive for a subsequent cell re-selection.

At block 306, the UMTS identification and tracking system 168 requests the permanent user identity from the target mobile device 120. The permanent user identity may be used to identify the target user mobile device 120 and to subsequently track the target user mobile device 120 after the mobile device 120 has re-selected to the GSM identification and tracking system.

At block 308, when the target mobile device 120 camps on the masquerading UMTS base station 170, special signaling interaction to the target mobile 120 device 1) avoids the use of integrity protection and 2) forces the mobile device 120 into a transient state that allows subsequent cell re-selection to GSM. This re-selection process can be forced by, for example, 1) reducing the pilot power of the masquerading UMTS base station 170, thus making it less attractive to camp on or 2) by manipulating the cell re-selection parameters broadcast by the masquerading UMTS base station 170 or 3) by forced inter-system re-direction after paging. Thereafter, the GSM identification and tracking system 166 operates in a conventional manner to identify and track the mobile device 120 that was forced to operate in the GSM mode.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for tracking a mobile device in a wireless communications system, comprising:
   establishing communications between the mobile device and a masquerading base station operating in a first mode of operation, wherein the first mode of operation uses integrity protection;
   forcing the mobile device to operate in a second mode of operation, wherein the second mode of operation does not use integrity protection; and
   tracking the mobile device in the second mode of operation.

2. The method, as set forth in claim 1, wherein urging the mobile device to operate in the second mode of operation further comprises broadcasting system information from the masquerading base station indicating that a base station using the second mode of operation is preferred when re-selecting.

3. The method, as set forth in claim 1, further comprises requesting a permanent user identity from the mobile device.

4. The method, as set forth in claim 3, further comprising transferring the mobile device into an transient state to avoid an integrity protection mechanisms.

5. The method, as set forth in claim 1, further comprising compromising the quality of the communications between the masquerading base station and the mobile device to force the mobile device to operate in the second mode of operation.

6. The method, as set forth in claim 1, further comprising manipulating system parameters controlling a cell re-selection process in the mobile device to force the mobile device to operate in the second mode of operation.

7. The method, as set forth in claim 1, further comprising using forced inter-system re-direction after paging to force the mobile device to operate in the second mode of operation.

8. The method, as set forth in claim 1, wherein tracking the mobile device in the second mode of operation further comprises using a Global System for Mobile communications tracking system.

9. A method for tracking a mobile device in a wireless communications system, comprising establishing communications between the mobile device and a masquerading base station operating in a first mode of operation, wherein the first mode of operation uses integrity protection, the mobile device communicating with a first base station in the first mode of operation;

forcing the mobile device to operate in a second mode of operation;

tracking the mobile device in the second mode of operation; and compromising the quality of the communications between the first base station and the mobile device.

10. A method for tracking a mobile device in a wireless communications system, comprising:

establishing communications between the mobile device and a masquerading base station operating in a first mode of operation, the mobile device communicating with a first base station in the first mode of operation;

urging the mobile device to operate in a second mode of operation;

tracking the mobile device in the second mode of operation; and urging the mobile device to re-select the masquerading base station.

11. The method, as set forth in claim 10, wherein urging the mobile device to re-select the masquerading base station further comprises compromising the quality of the communications between the first base station and the mobile device.

12. The method, as set forth in claim 11, wherein compromising the quality of the communications between the first base station and the mobile device further comprises transmitting signals that interfere with communications between the first base station and the mobile device.

* * * * *